United States Patent [19]
Saxton et al.

[11] Patent Number: 4,536,108
[45] Date of Patent: Aug. 20, 1985

[54] FLEXIBLE MICRODRILL

[75] Inventors: Robert W. Saxton, Mount Prospect; William R. Hewitt, Clarendon Hills; Jerome M. Nelligan, Matteson, all of Ill.

[73] Assignee: Federal-Mogul Corporation, Southfield, Mich.

[21] Appl. No.: 521,338

[22] Filed: Aug. 8, 1983

Related U.S. Application Data

[63] Continuation-in-part of Ser. No. 497,069, May 23, 1983, abandoned.

[51] Int. Cl.³ .............................................. B23B 51/00
[52] U.S. Cl. .................................... 408/230; 408/226; 408/704
[58] Field of Search ............................ 408/1, 226–230, 408/704, 199, 144; 76/108 R, 108 T

[56] References Cited

U.S. PATENT DOCUMENTS

| 2,962,154 | 11/1960 | Falk | 206/379 |
| 3,429,171 | 2/1969 | Feher | 408/226 |
| 3,778,180 | 12/1973 | Ostrom | 408/704 X |
| 3,790,297 | 2/1974 | Maursey | 408/226 X |
| 3,850,054 | 11/1974 | Weissman | 408/226 X |
| 4,078,458 | 3/1978 | Berendzen | 408/230 X |
| 4,080,093 | 3/1978 | Maier | 408/226 X |
| 4,135,847 | 1/1979 | Hemmings | 408/226 X |
| 4,190,386 | 2/1980 | Brabetz et al. | 408/1 R |
| 4,232,985 | 11/1980 | Nielsen | 408/226 |
| 4,253,830 | 3/1981 | Kazen et al. | 433/77 |
| 4,345,899 | 8/1982 | Vlock | 408/226 X |

FOREIGN PATENT DOCUMENTS

| 2811977 | 9/1979 | Fed. Rep. of Germany | 408/226 |
| 592530 | 2/1978 | U.S.S.R. | 408/226 |

Primary Examiner—William R. Briggs
Attorney, Agent, or Firm—Robert F. Hess

[57] ABSTRACT

The flute terminus or carry out of a microdrill is located spaced from cross-sectional changes of the drill and away from such areas of stress concentration and permits a slight flexing of the drill to compensate for standard production environment in efficiencies such as spindle runout, nonperpendicularity of drill to workpiece and workpiece material which is not homogeneous.

15 Claims, 6 Drawing Figures

FLEXIBLE MICRODRILL

CROSS REFERENCE TO RELATED APPLICATION

This application is a continuation-in-part application of pending application of pending application Ser. No. 497,069, filed May 23, 1983, abandoned.

BACKGROUND OF THE INVENTION

1. Field of the Invention

The present invention relates to drills, and is more particularly concerned with microdrills as may be used in drilling circuitboards.

2. Description of the Prior Art

When microdrilling, for example on the order of 0.004"–0.025", in the circuitboard industry, a different set of drilling criteria must be addressed and evaluated in that drill breakage becomes a major factor. There are many forces which act on a microdrill when it is in the cut. Any of these forces, or a combination thereof, may cause drill breakage if they exceed the strength of the drill. Some of the major forces affecting drill breakage are the torque from the cutting edges, the thrust from in-feed, the friction on the hole wall, deflection and the chip moving force. Rupture results when the total force on the microdrill exceeds the minimum cross-sectional rupture strength at the point of stress concentration.

The above forces are those which originate in the actual cutting process. Other forces which add to breakage are those stemming from machine mechanics, rigidity of fixture, harmonic vibration and material composition. If it were possible to eliminate all of the negative forces external to those which originate in the actual cutting process, then conventional circuitboard drill geometry would prevail. However, because microdrill cross-sectional areas are so small, their rupture strengths are proportionately low. For this reason, it is imperative that the drill be designed so that it may withstand as much of the total negative forces as possible.

It is impractical for the user to completely control all of the operational forces such as zero spindle runout, absolute perpendicularity of drill to workpiece, homogeneity of circuitboard material, etc. These parameters must be closely controlled; however, it is the drill manufacturer's responsibility to produce a microdrill that can operate under production requirements.

There are major differences in microdrilling when it is compared to standard circuitboard drilling which requires different approaches to geometry and materials in the microdrill itself.

The standard practice for surface footage is to operate between 600–700 surface feet per minute (SFM). A #57 drill (0.043") would be used at between 53,000–62,000 rpm. Since 6,00014 80,000 rpm is the limit of most production equipment presently in use, the SFM of a #97 drill (0.0059") would be 92–122 SFM or approximately 14% of a #57 drill. In order to run a #97 microdrill at 700 SFM, 453,000 rpm would be required.

It is standard practice in the industry to mount a plurality of microdrills and operate the drilling machine somewhat in the manner of a punch press with a stroke of up to, for example, 200 strokes per minute. Therefore, microdrills must be operated at fairly high rpm.

The ratio of the length of a column as compared to its diameter, or as applied to a drill, the body length to the drill diameter, is known as the aspect ratio. As an example, the aspect ratio of a #57 drill would be 9.3 to 1. On a #97 drill, although body length is shortened somewhat, the aspect ratio is 16.9 to 1.

The chisel edge cutting zone is a negative rake cutting zone that is pushing or grinding material instead of shearing. This is a cutting area of high thrust force and heat. As can be demonstrated, this zone is disproportionate in a microdrill when compared with a standard #57 drill. This relative increase in the high temperature grinding zone can cause premature wear on the cutting edges which will cause breakage due to increased torque forces.

The weakest section of the drill under stress is at the rear of the fluted portion, where the fluted web carries into the drill body. Conventional microdrill structure provides, as disclosed for example by Andreas Maier in his U.S. Pat. No. 4,080,093, the flute terminus location be on a conical tapered section which connects the shank to the drill body. On microdrills, as well as all drills, it is imperative that the web is tapered along the flute, with a larger web at the rear. This helps to increase the strength of the drill at this critical point.

Another possible cause of breakage in microdrills is the friction created between the drill body and the walls of the hole being drilled. This can be alleviated by providing backtaper along the drill body. However, backtaper must be precisely controlled within close limits to ensure that a sufficient strength is retained at the back of the drill, yet provide the benefits of backtaper.

As will be appreciated from the detailed description below, drilling problems of the type mentioned above, such as minor spindle misalignment, inconsistencies in the board material, and irregularities in the entry material surface can create bending forces on the drill at the shoulder of the drill body on a common shank drill where the flute is carried out.

On drills where the diameter is of sufficient size, such as a #57 drill, the drill has sufficient strength at this point to resist bending. However, on microdrills where the drill diameter is much smaller, these forces will deflect the drill. This creates a maximum stress at the shoulder of the drill body. If the flute carries out and is terminated at this point of maximum stress the drill will have a tendency to fail at this point.

SUMMARY OF THE INVENTION

The object of the present invention is to provide a microdrill structure which permits an increased degree of flexing and thereby minimizes breakage.

According to the invention, the above object is achieved by providing an unfluted or intermediate section between the flute carry out and a conical tapered section which connects the drill body to the shank. This structure shifts the weakest section of the drill under stress away from the maximum stress point and permits the drill to have enough resiliency to accommodate the bending stresses without breakage.

BRIEF DESCRIPTION OF THE DRAWING

Other objects, features and advantages of the invention, its organization, construction and operation will be best understood from the following detailed description taken in conjunction with the accompanying drawing, on which.

DESCRIPTION OF THE PREFERRED EMBODIMENTS

Figure 1:
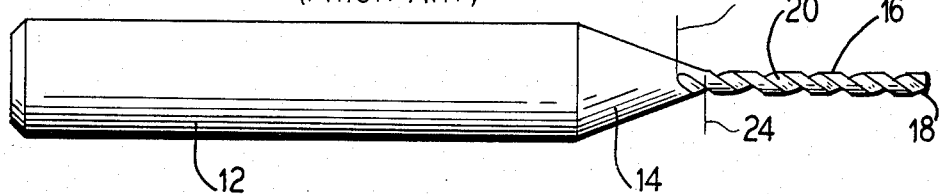
FIG. 1 is a side elevation of an embodiment of a microdrill which is well known in the art.

Referring to FIG. 1, a microdrill is generally illustrated at 10 as comprising a shank 12, a conical tapered section 14 and a drill body 16. This known structure provides that the drill body, prior to the provision of flutes, be substantially cylindrical, but with a slight inward taper toward the shank to reduce friction with respect to the wall of the bore. As illustrated, the drill body 16 comprises a cutting tip 18 and a plurality of helical flutes 20 which extend from the cutting tip 18 to a flute terminus location 22 on the conical tapered section 14. As a result, the reduced cross-section of the drill body is at the location 24 of the highest stress concentration.

Figure 2:
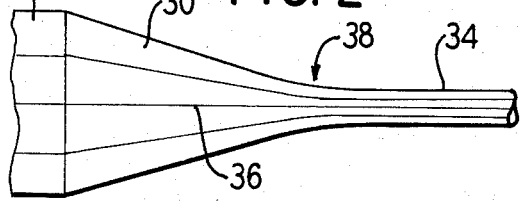
FIG. 2 is a fragmentary illustration of a drill profile illustrating high stress concentrations by way of flow lines.
Figure 3:
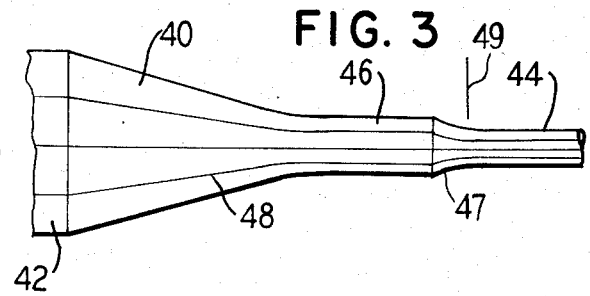
FIG. 3 is a fragmentary view of another drill profile, illustrating, again via flow lines, the reduction of high stress concentrations through a stepped configuration.

The above is best seen with reference to FIGS. 2 and 3.

As mentioned above, rapid or abrupt changes in the cross-sectional area of a drill are detrimental to its strength. The points at which such changes occur are areas of high stress concentrations and are very susceptible to breakage. This is particularly true with respect to microdrills where the drill body is ground down to diameters as small as 0.005". The high stress concentration at the location 24 of FIG. 1 will be best understood with reference to FIG. 2 which is a representation of that section of a microdrill comprising a shank 32 connected by way of a conical tapered section 30 to a drill body section 34. In a standard engineering practice for analyzing stress concentrations in any type of part subjected to forces, one applies flow lines through the drill profile. Such flow lines 36 have been illustrated in FIG. 2. The flow lines should not change direction rapidly. As seen in FIG. 2, the rapid change in direction of the flow lines is at the weakest portion of the drill, that is at the area 38, which corresponds to the location 24 in FIG. 1. The high stress concentration is reduced with a stepped design, as shown in FIG. 3, for a drill which has a shank 42 connected to a drill body section 44 by way of a stepped design including a conical tapered section 40 and a generally cylindrical section 46. The flow lines 48 illustrate a reduction of stress concentration at the forward end of the conical tapered section 40. With such a stepped design, a smaller tapered section 47 is provided and, with a flute terminus location on this section, in the manner of FIG. 1, the reduced cross-section of the drill body would still be at a stress concentration location 49.

Figure 4:
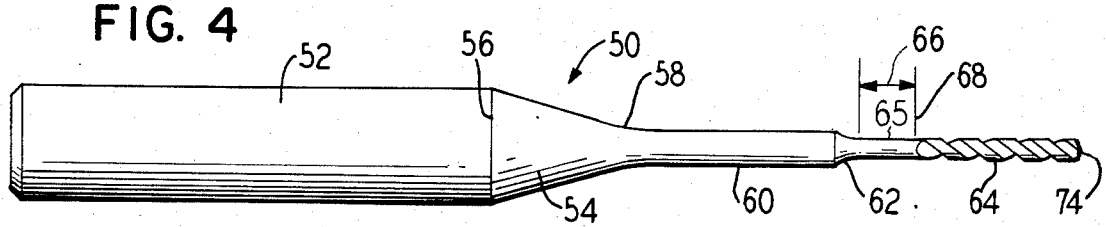
FIG. 4 is a side view of a microdrill constructed in accordance with the present invention.
Figure 5:
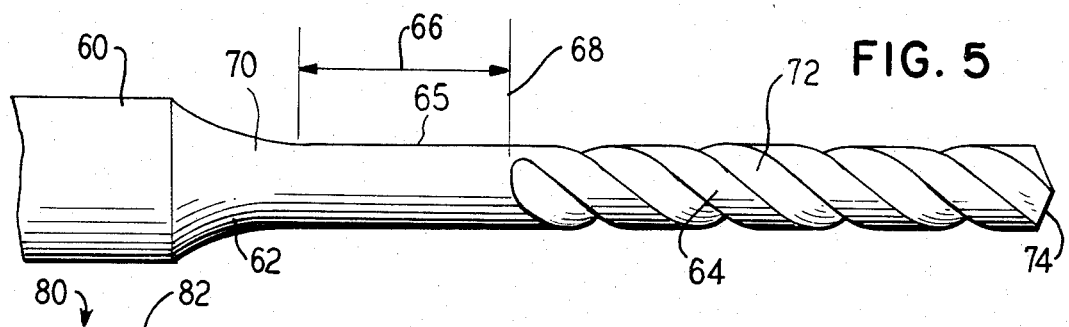
FIG. 5 is an enlarged showing of the forward end of the microdrill of FIG. 4.

FIG. 4 illustrates an embodiment of the invention which locates the reduced cross-sectional area of the drill body away from the point of the highest stress concentration. FIG. 4 illustrates a 0.125" common shank microdrill 50 having a length in the range of 1"-2" and comprising a cylindrical shank 52 which is connected to a drill body 64 by way of a stepped configuration. This stepped configuration comprises a conical section 54 which tapers inwardly at about 14°-19°, preferably, 16°, with respect to the axis of the microdrill from the 0.125" diameter of the shank 52, indicated at 56, to a second diameter of a cylindrical section 60, with a smooth transition in the area 58. The cylindrical section 60 is connected to the drill body 64 by way of a transition section 62, for example of a predetermined radius in the range of 0.110"-0.125", and an intermediate flex section 65. The intermediate flex section 65 has a length 66, for example, in the range of 0.010"-0.040", preferably 0.010"-0.030", and as best seen in FIG. 5, extends from the forward end of the transition section 62 to a flute terminus location 68. The drill body 64 comprises flutes 72 which extend between a cutting tip 74 and the flute terminus 68 so that the reduced cross-sectional area of the drill body is not at a point of high stress concentration, generally indicated at 70. The drill body has a flute length in the range of 0.030"-0.200" preferably 0.030"-0.150" and a diameter in the range of 0.004"-0.025".

The flex section 64 has a length at least greater than the drill body diameter and selected with respect to the particular drilling application. The greater the length of the flex section, for example for drilling greater numbers of layers, provides for less breakage; however, there is less accuracy of the resulting hole location due to greater flexing of the flex section.

Figure 6:
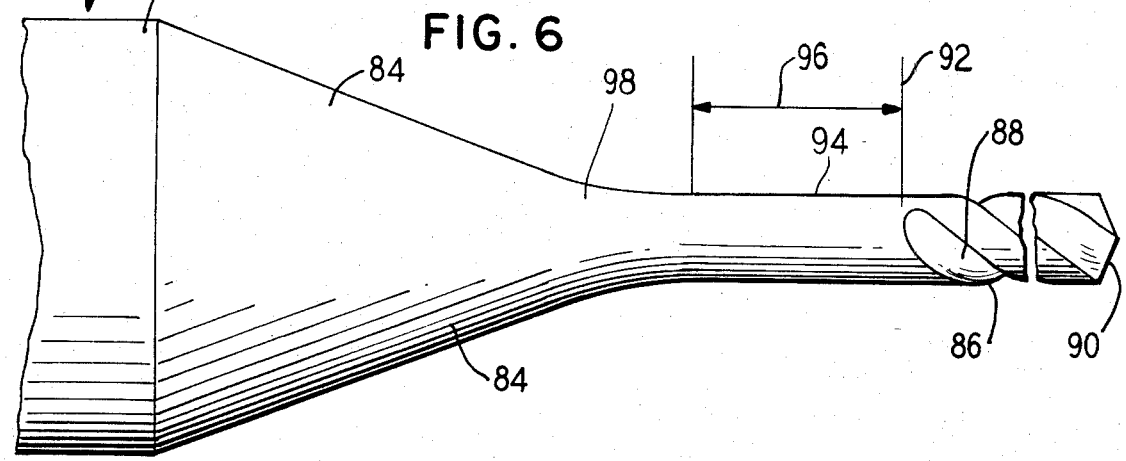
FIG. 6 is an enlarged view of the forward end of a microdrill constructed in accordance with the present invention for a drill-profile of the type illustrated in FIG. 2.

Referring to FIG. 6, another embodiment of the invention is generally illustrated at 80 as comprising a shank 82, a conical tapered section 84, and a drill body 86 having flutes 88 which extend from a cutting tip 90 to a flute terminus location 92. The drill body 86 is connected to the conical tapered section 84 by way of an intermediate flex section 94 having a predetermined length 96, for example 0.020", and thus the flute terminus location and the reduced cross-sectional area of the drill body are remote from the area of high stress concentration, generally indicated at 98.

For ease of review, the dimensions set forth above and which have been found advantageous in practicing the invention, are set forth below in tabular form.

| Drill Shank Diameter | .125" |
|---|---|
| Drill Length | 1"-2" |
| Drill Body Diameter | .004"-.025" |
| Drill Body Length | .030"-.200" |
| (Flute Length) | .030"-.150" |
| (Preferable) | |
| Flex Section Length | .010"-.040" |
| (Preferable) | .010"-.030" |

The reason for the preferable range of flex section length is that flexing will cause the drill to penetrate along an accurate path and will cause inaccurate hole locations, particularly in multilayer drilling applications, and registration problems between circuit boards and machines in subsequent processing steps.

As an example of spindle speed and feed for microdrills based on 650 SFM and chip load, the following schedule is provided to illustrate the high speed and feed requirements for microdrills.

| Microdrill Diameter | Spindle Speed (rpm) | Feed (inches/minute) |
| --- | --- | --- |
| .8 mm | 78,825 RPM | 355 IPM |
| .85 mm | 74,119 RPM | 334 IPM |
| .90 mm | 70,141 RPM | 316 IPM |
| .95 mm | 66,390 RPM | 299 IPM |
| 1.00 mm | 63,020 RPM | 284 IPM |
| 1.05 mm | 60,121 RPM | 271 IPM |
| 1.10 mm | 57,344 RPM | 258 IPM |
| 1.15 mm | 54,812 RPM | 247 IPM |
| 1.20 mm | 52,605 RPM | 237 IPM |
| 1.25 mm | 50,467 RPM | 227 IPM |
| 1.30 mm | 48,496 RPM | 218 IPM |
| 1.35 mm | 46,760 RPM | 210 IPM |

Although we have described our invention by reference to particular illustrative embodiments thereof, many changes and modifications of the invention may become apparent to those skilled in the art without departing from the spirit and scope of the invention. We therefor intend to include within the patent warranted hereon all such changes and modifications as may reasonably and properly be included within the scope of our contribution to the art.

We claim:

1. In a microdrill of the type which comprises a drill body of predetermined diameter including a cutting tip and helical flutes extending along said drill body from said cutting end to a flute terminus location, a shank to be engaged and rotated about a longitudinal axis by a drilling machine, and a frusto-conical section connecting said shank and said drill body and forming a high stress location at such connection, the improvement therein comprising:

an additional, flexible, intermediate section between and connecting said frusto-conical section and said drill body and having a length at least greater than said predetermined diameter and spacing said flute terminus location from said frusto-conical section to provide spacing of the drill body from said high stress location, and to provide flexing of said microdrill in said intermediate section, at least the frustoconical section, the intermediate section and the drill body being composed of a unitary structure.

2. The improved microdrill of claim 1, wherein: the drill body comprises a diameter in the range of 0.004 inches to 0.025 inch; and said additional, flexible, intermediate section comprises a length in the range of 0.010 inch to 0.040 inch.

3. In a microdrill of the type which comprises a shank of a first diameter to be engaged and rotated about a longitudinal axis by a drilling machine, an axially-extending frusto-conical section connected to said shank, an axially-extending cylindrical section of a second, smaller diameter connected to said frusto-conical section, and an axially-extending drill body of predetermined diameter including a cutting tip and helical flutes extending rearwardly from said cutting tip to a flute terminus location, said drill body connected to said cylindrical section at said flute terminus location, such connection being a high stress location, the improvement therein comprising:

an additional, flexible, intermediate section of said predetermined diameter and having a length at least greater than said predetermined diameter connecting said drill body to said cylindrical section and spacing said flute terminus location from said cylindrical section, to provide spacing of the drill body from said high stress location and to provide flexing of the microdrill in said intermediate section, at least the frustoconical section, the intermediate section and the drill body being composed of a unitary structure.

4. The improved microdrill of claim 3, wherein: the drill body comprises a diameter in the range of 0.004 inch to 0.025 inch; and said additional, flexible, intermediate section comprises a length in the range of 0.010 inch to 0.040 inch.

5. A microdrill comprising:

a cylindrical shank, including a longitudinal axis of rotation, to be engaged by a drilling machine for rotation about its longitudinal axis;

a tapered section including a first end and a second end, said first end connected to said shank and said section tapering along and toward said axis to a lesser predetermined diameter at said second end and providing a high stress location in said microdrill; and a flexible member of said predetermined diameter connected to said second end of said tapered section, said flexible member including a drill body comprising a cutting tip and helical flutes extending from said cutting tip to a flute terminus location spaced from said second end of said tapered section to provide a flute-free flex section and having a length at least greater than said predetermined diameter and spacing of the fluted drill body away from the high stress location of said second end of said tapered section, at least the tapered section and the flexible member including the drill body being composed of a unitary structure.

6. A microdrill comprising:

a cylindrical shank, including a diameter of approximately 0.125 inch and a longitudinal axis of rotation, to be engaged by a drilling machine for rotation about its longitudinal axis;

a tapered section including a first end and a second end, said first end connected to said shank and said section tapering along and toward said axis to a predetermined diameter in the range of 0.004 inch to 0.025 inch at said second end and providing a high stress location in said microdrill; and a flexible member of said predetermined diameter connected to said second end of said tapered section, said flexible member including a drill body comprising a cutting tip and helical flutes extending from said cutting tip to a flute terminus location spaced in the range of 0.010 inch to 0.040 inch from said second end of said tapered section and having a length at least greater than said predetermined diameter to provide a flute-free flex section and spacing of the fluted drill body away from the high stress location of said second end of said tapered section, at least the tapered section and the flexible member including the drill body being composed of a unitary structure.

7. The microdrill of claim 6, wherein:
said flutes comprise length in the axial direction in the range of 0.030 inch to 0.200 inch.

8. The microdrill of claim 6, wherein:
the overall length of the microdrill is in the range of 1 inch to 2 inches.

9. The microdrill comprising:

a cylindrical shank, including a longitudinal axis of rotation, to be engaged by a drilling machine for rotation about its longitudinal axis;

a tapered section including a first end connected to said shank for rotation therewith about said axis and a second end, said tapered section tapering from the diameter of said shank at said first end along and toward said axis to an intermediate diameter at said second end;

a first cylindrical section of said intermediate diameter including a proximal end connected to said second end of said tapered section for rotation about said axis, and a distal end;

a drill body for rotation about said axis, said drill body having a predetermined diameter and including a cutting tip and helical flutes extending along said drill body from said cutting tip to a flute terminus location; and a flexible second cylindrical section for rotation about said axis and having a length at least greater than said predetermined diameter and connecting said distal end of said first cylindrical section and said drill body at said flute terminus location, at least the tapered section, the second cylindrical section and the drill body being composed of a unitary structure.

10. The microdrill of claim 9, and further comprising:
a concave portion of predetermined radius connecting said first and second cylindrical sections.

11. A microdrill comprising:
a cylindrical shank, including a diameter of approximately 0.125 inch and a longitudinal axis of rotation, to be engaged by a drilling machine for rotation about its longitudinal axis;

a tapered section including a first end connected to said shank for rotation therewith about said axis and a second end, said tapered section tapering at approximately 16° from the diameter of said shank at said first end along and toward said axis to an intermediate diameter at said second end;

a first cylindrical section of said intermediate diameter including a proximal end connected to said second end of said tapered section for rotation about said axis, and a distal end;

a drill body for rotation about said axis, said drill body including a diameter in the range of 0.004 inch to 0.025 inch, a cutting tip and helical flutes extending along said drill body from said cutting tip to a flute terminus located in the range of 0.030 inch to 0.200 inch from said cutting tip; and a flexible second cylindrical section for rotation about said axis and connecting said distal end of said first cylindrical section and said drill body at said flute terminus, said flexible second section comprising a length at least greater than said drill body diameter and in the range of .0010 inch to 0.040 inch, at least the tapered section, the second cylindrical section and the drill body composed of a unitary structure.

12. The microdrill of claim 11, and further comprising:
a concave portion of predetermined radius connecting said first and second cylindrical sections.

13. The microdrill of claim 12, wherein:
said predetermined radius is in the range of 0.110 inch to 0.125 inch.

14. The microdrill of claim 11, wherein:
said microdrill comprises an overall length in the range of 1 inch to 2 inches.

15. A microdrill comprising:
a cylindrical shank, including a diameter of approximately 0.125 inch and a longitudinal axis of rotation, to be engaged by a drilling machine for rotation about its longitudinal axis;

a tapered section including a first end connected to said shank for rotation therewith about said axis and a second end, said tapered section tapering at an angle of approximately 16° from the diameter of said shank at said first end along and toward said axis to an intermediate diameter at said second end;

a first cylindrical section of said intermediate diameter including a proximal end connected to said second end of said tapered section for rotation about said axis, and a distal end;

a drill body for rotation about said axis, said drill body including a diameter in the range of 0.004 inch to 0.025 inch, a cutting tip and helical flutes extending along said drill body from said cutting tip to a flute terminus located in the range of 0.030 inch to 0.200 inch from said cutting tip;

a flexible second cylindrical section for rotation about said axis and connecting said distal end of said first cylindrical section and said drill body at said flute terminus, said flexible second section comprising a length at least greater than said drill body diameter and in the range of 0.010 inch to 0.040 inch; and said cylindrical shank, said tapered section, said first and second cylindrical sections and said drive body together comprising a total length in the range of 1 inch to b 'inches, at least the tapered section, the second cylindrical section and the drill body being composed of a unitary structure.

* * * * *

UNITED STATES PATENT AND TRADEMARK OFFICE
CERTIFICATE OF CORRECTION

PATENT NO. : 4,536,108
DATED : August 20, 1985
INVENTOR(S) : Robert W. Saxton, William R. Hewitt and Jerome M. Nelligan It is certified that error appears in the above-identified patent and that said Letters Patent is hereby corrected as shown below:

Column 1, line 7, after "application" delete "of pending application".

Column 1, line 55, "6,00014 80,000" should read "6,000--80,000".

Column 3, line 13, "drill-profile" should read "drill profile".

Column 8, line 6, ".0010" should read .010".

Column 8, line 8, after "body" insert "being".

Column 8, line 49, after "to" delete "b'" and insert "2".

Signed and Sealed this

Fourth Day of November, 1986

[SEAL]

*Attest:*

DONALD J. QUIGG

*Attesting Officer*  *Commissioner of Patents and Trademarks*